Dec. 30, 1958     J. E. HECKETHORN     2,866,349
VARIABLE SPEED DRIVES FOR AUTOMOTIVE GENERATORS
Filed May 27, 1957            2 Sheets-Sheet 1

INVENTOR.
John E. Heckethorn
BY
ATTORNEY

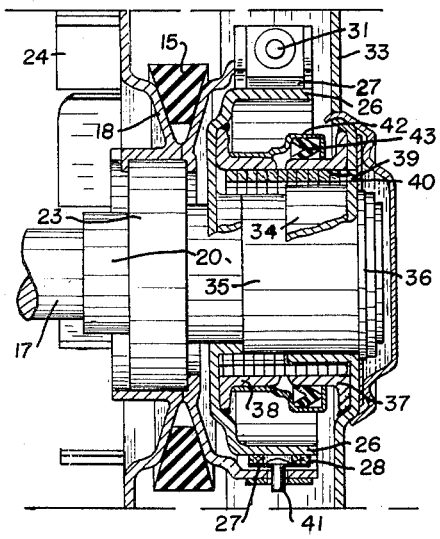
Fig. 5
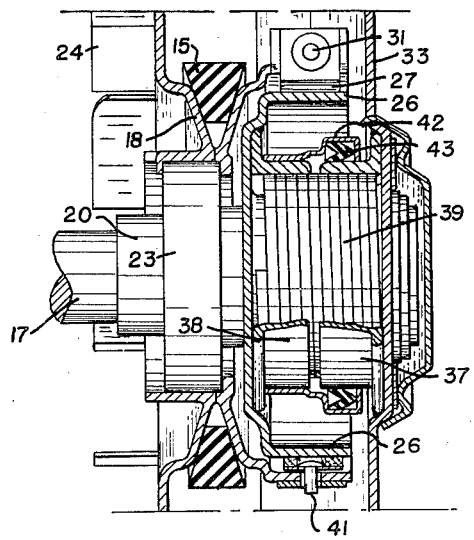
Fig. 6
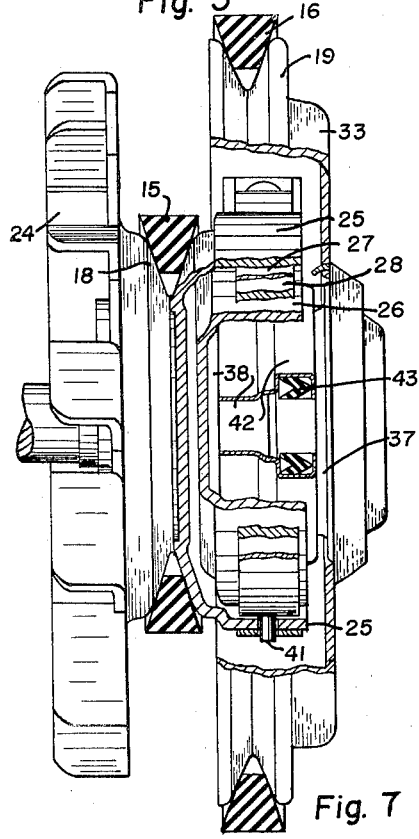
Fig. 7
INVENTOR.
John E. Heckethorn
BY
ATTORNEY United States Patent Office 2,866,349
Patented Dec. 30, 1958

2,866,349

VARIABLE SPEED DRIVES FOR AUTOMOTIVE GENERATORS

John E. Heckethorn, Denver, Colo., assignor to Heckethorn Manufacturing & Supply Co., Littleton, Colo., a corporation of Colorado Application May 27, 1957, Serial No. 661,953

4 Claims. (Cl. 74—336)

This invention relates to a variable speed drive for automotive generators. With present-day automobiles capable of maintaining speeds of from 80 to 100 miles an hour for long periods, the generator armatures are subjected to excessive centrifugal strains, often resulting in damaged armatures and other working parts.

The principal object of this invention is to provide a drive for an automotive generator which will automatically shift to a lower drive ratio when the automotive vehicle has reached a predetermined speed, so as to prevent damage to the armature windings.

The average automotive vehicle is used for a major portion of its time in town driving at low speeds with many stops. Therefore, it is desirable that the generator generate its full voltage at relatively low speeds. Another object of this invention is to provide an automatic generator drive which will provide a higher drive ratio for the generator when the vehicle speed is below a predetermined minimum.

A further object of the invention is to provide a relatively simple drive mechanism which will accomplish the above results with a minimum of working parts so that it can be economically installed and so that it will be substantially trouble-free in operation.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Figs. 5 and 6 are sections similar to the section of Fig. 3, with various internal parts broken away to show the interior construction of the improved variable generator drive; and Fig. 7 is a side view of the improved variable generator drive partially broken away to show interior construction.

Figure 1:
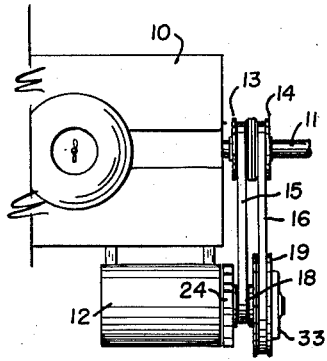
Fig. 1 is a top diagrammatic view illustrating the relation of the improved drive mechanism to a conventional automotive engine and generator.
Figure 2:
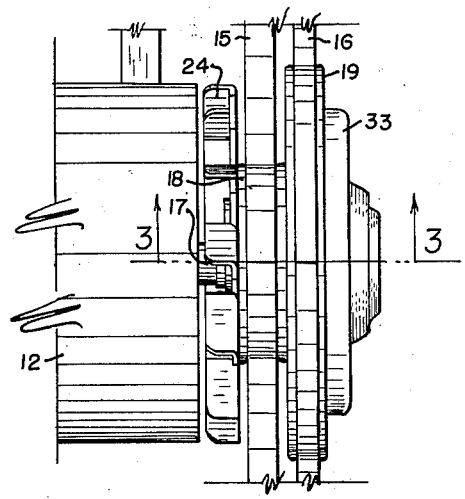
Fig. 2 is an enlarged top view of the improved variable generator drive.
Figure 3:
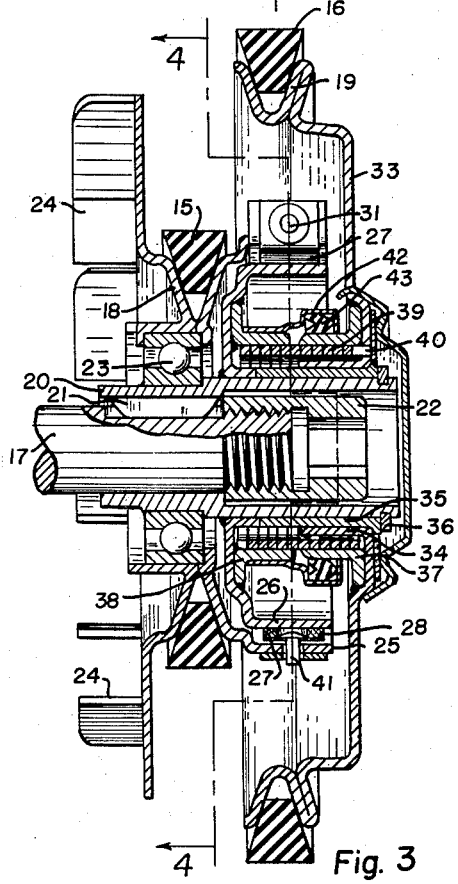
Fig. 3 is a longitudinal section therethrough, taken on the line 3—3, Fig. 2.

In Fig. 1 a conventional automotive engine has been diagrammatically indicated at 10 with its engine shaft at 11, generator at 12, and generator shaft at 17. This invention is designed to transmit rotation to the generator shaft 17 from the engine shaft 11 through the medium of either of two V-belts 15 and 16 trained about a first drive pulley 13 and a second drive pulley 14, respectively, keyed to or otherwise affixed to the engine shaft 11. If found desirable, the pulleys 13 and 14 may differ in diameter. Herein they will be described as similar in diameter. The first V-belt 15 extends about a driven sheave 18 concentrically mounted on the generator shaft 17, and the second V-belt 16 is trained about a driven sheave 19 of larger diameter than the sheave 18 and also concentrically mounted on the generator shaft 17.

This invention is designed to allow the first belt 15 to drive the generator 12 while the engine shaft 11 is rotating at relatively low speeds, and to transfer the drive to the second belt 16 when the rotation of the engine shaft 11 has increased to a predetermined speed so as to provide a reduced speed ratio for the generator 12.

The improved variable speed drive mechanism is mounted on a tubular hub member 20 which is keyed to the generator shaft 17 by means of a suitable key 21, and which is locked in place thereon by means of a terminal nut 22 threaded onto the extremity of the generator shaft 17. The smaller driven sheave 18 is mounted upon ball bearings 23 upon the hub member 20 so that it may rotate independently of the generator shaft 17.

One side of the smaller driven sheave 18 is formed into a generator cooling fan 24. The opposite side of the driven sheave 18 extends forwardly and is formed into an annular clutch housing 25. The clutch housing 25 concentrically surrounds a bowl-shaped clutch drum 26 which is fixedly mounted on the hub member 20 so as to rotate integrally therewith. The clutch drum 26 is spaced from the housing 25 to form an annular band chamber therebetween in which a flexible clutch band 27, lined with suitable friction lining 28, is positioned.

The extremities of the clutch band 27 are extended outwardly through an opening 29 formed in the housing 25. One extremity of the band is hooked around one edge of the opening, as shown at 30. The other extremity is mounted on a slide pin 31 supported on the housing 25, and the latter extremity is constantly urged forwardly on the pin 31 by means of a suitable compression spring 32 so as to resiliently contract the band 27 so as to clamp the band lining 28 in frictional engagement about the clutch drum 26.

It can be seen from the above description that if the engine shaft 11 be rotating in a clockwise direction, the sheave 18 will be driven in a clockwise direction on its bearings 23. This rotation will be imparted to the clutch housing 25 and from the latter to the clutch band 27 and its lining 28. The lining 28, being in frictional engagement with the clutch drum 26, will impart rotation to the latter, and the drum, being affixed on the hub member 20, will impart rotation to the generator shaft 17.

However, should the speed of rotation of the engine shaft 11 reach a predetermined point, centrifugal force will act upon the band 27, causing it to tend to expand radially in all directions. This radial expansion causes one extremity of the band to be drawn rearwardly along the slide pin 31 against the bias of the spring 32. As the speed increases, a point will eventually be reached when the diameter of the band 27 will increase sufficiently so that its lining 28 will release its frictional engagement with the drum 26, so that rotative movement will be no longer transmitted to the generator shaft 17 from the driven sheave 18, and the latter will ride freely on its ball bearings 23.

The outer wall of the larger driven sheave 19 is continued inwardly to form a circular sheave disc 33 provided with an inwardly extending, cylindrical hub portion 34 which freely rotates upon a bronze bearing sleeve 35 which is pressed over the hub member 20 and is retained in place thereon by means of a suitable snap ring 36.

An annular clutch flange 37 is welded or otherwise concentrically affixed on the sheave disc and extends inwardly therefrom. The clutch flange 37 is of larger diameter than the hub portion 34 and is positioned in concentric spaced relation thereto. A second annular clutch flange 38 is welded or otherwise affixed to the clutch drum 26 and extends outwardly toward the first annular clutch flange 37 and terminates in relatively close spaced relation thereto. The two clutch flanges 37 and 38 are similar in diameter.

A tightly wound, helical, cylindrical clutch spring 39 is positioned within the enclosure of the two annular clutch flanges 37 and 38 and overlaps both flanges. This clutch spring is of a conventional type used in over-running or free-wheeling clutch structures. One end of the clutch spring, shown at 40, is extended through a receiving opening in the sheave disc 33 so that the latter extremity of the clutch spring must rotate in unison with the sheave disc. The other extremity freely terminates within the annular clutch flange 38.

Figure 4:
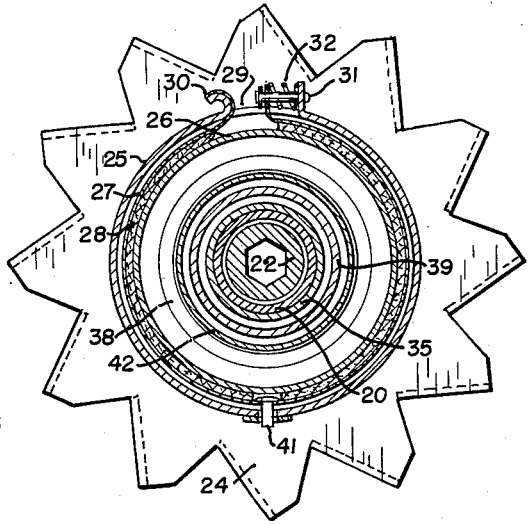
Fig. 4 is a cross-section therethrough, taken on the line 4—4, Fig. 3.

The installation of the clutch spring is such that if the extremity of the spring in the clutch flange 38 be retarded, and the extremity in the clutch flange 37 be rotated forwardly, or in the direction of the arrow in Fig. 4, the entire spring will be diametrically expanded so that it will frictionally engage and simultaneously grip the inner surfaces of both clutch flanges 37 and 38.

Thus, when the speed has reached a point where the clutch band 27 releases the clutch drum 26, the latter will tend to slow down. This will slow down the clutch flange 38, creating a retarding action on one extremity of the spring, while the rotating sheave 19, through the fixed end 40, will impart a forward rotation to the other extremity thereof, thus creating an expanding action on the spring so as to clutch the flanges 37 and 38 together so that power will now be transmitted from the belt 16 through the sheave 19, the sheave disc 33, the clutch flange 37, the clutch spring 39, and the clutch flange 38 to the clutch drum 26, and from thence to the hub member 20 and the generator shaft 17. Under these conditions the generator shaft is being rotated by the second belt 16 at a reduced ratio while the belt 15 is idling.

Should the speed of the engine shaft 11 decrease, a point will be reached where the clutch band 27 will contract and again engage the clutch drum 26, driving it forwardly more rapidly than the sheave 19 is rotating. This will allow the clutch spring 39 to contract, releasing its driving connection with the larger sheave 19, and the generator will be again driven through the smaller sheave 18.

It will be noted that both the clutch spring and the clutch band are self-energizing, that is, the greater the torque applied thereto, the greater will be their frictional engagement. It will be noted that the self-wrapping action of the clutch band maintains its lining snugly fitted against the entire circumference of the clutch drum until such time as centrifugal force exceeds the combination of the self-energizing action and the tension exerted by the actuating spring 32. The ratios are preferably proportioned so that the top speed of the automotive generator is limited to a maximum of 5500 R. P. M. at top road speed, and also to provide sufficient generator speed at minimum road speed to provide full generating capacity at speeds encountered in heavy city traffic.

While particularly designed for driving and controlling the speed of an automotive generator, the invention will find other uses, such as driving and controlling the speed of a refrigeration compressor of an automotive air-conditioning unit so as to provide a high cooling rate at slow speeds and a reasonably low R. P. M. when driving at high speeds.

While a specific form of the improvement has been described and illustrated herein, it is to be understood that the same may be varied, within the scope of the appended claims, without departing from the spirit of the invention.

Having this described the invention, what is claimed and desired secured by Letters Patent is:

1. Means for driving a driven shaft from a drive shaft through either of two speed ratios; comprising two transmission means, each transmission means including a drive pulley, a driven sheave, and a transmission belt transmitting power from said pulley to said sheave, a tubular hub fixed to said driven shaft, an annular clutch housing fixed to one of said sheaves, a clutch drum disposed within said clutch housing and being fixed to said tubular hub, clutch means disposed within said clutch housing and being operative upon said clutch drum within a predetermined speed range of said one of said sheaves, an annular clutch flange fixed to the other of said sheaves, a second annular clutch flange fixed to said clutch drum, a clutch spring disposed between said flanges and said tubular hub and having one end thereof connected to the other of said sheaves, said clutch spring being operative upon disconnection of said clutch means, whereby said driven shaft is driven by said drum shaft through either of two speed ratios.

2. The structure according to claim 1, wherein said sheaves are of different diameters with the one thereof which is provided with said clutch housing being of the smaller diameter, and said one of the sheaves being rotatably supported on said tubular hub.

3. The structure according to claim 1 wherein said clutch means comprises a flexible clutch band having a friction lining cooperating with said clutch drum, said clutch housing including a circumferential portion encircling said clutch drum and spaced therefrom, said circumferential portion being provided with an opening about an edge of which one end of said clutch band is secured, the opposite end of said clutch band extending through said opening, a pin carried by said circumferential portion outwardly of said opening and disposed tangentially of said circumferential portion, said pin extending through said opposite end of the clutch band, and a coil spring encircling said pin with one end thereof bearing on said opposite end of the clutch band.

4. The structure according to claim 1, wherein said clutch spring is a tightly wound helical spring.

References Cited in the file of this patent

UNITED STATES PATENTS

| | | |
|---|---|---|
| 1,983,827 | Winther et al. | Dec. 11, 1934 |
| 2,230,293 | Harris | Feb. 4, 1941 |
| 2,541,947 | Starkey | Feb. 13, 1951 |
| 2,694,175 | Davis | Nov. 9, 1954 |
| 2,694,937 | Birbaum | Nov. 23, 1954 |